United States Patent
Sierra et al.

(10) Patent No.: US 8,930,143 B2
(45) Date of Patent: Jan. 6, 2015

(54) RESOLUTION ENHANCEMENT FOR SUBTERRANEAN WELL DISTRIBUTED OPTICAL MEASUREMENTS

(75) Inventors: Jose R. Sierra, Mexico City (MX); Gerard Glasbergen, Gouda (NL)

(73) Assignee: Halliburton Energy Services, Inc., Houston, TX (US)

( * ) Notice: Subject to any disclaimer, the term of this patent is extended or adjusted under 35 U.S.C. 154(b) by 312 days.

(21) Appl. No.: 12/835,952

(22) Filed: Jul. 14, 2010

(65) Prior Publication Data

US 2012/0016587 A1  Jan. 19, 2012

(51) Int. Cl.
| | | |
|---|---|---|
| G01V 9/00 | (2006.01) | |
| E21B 47/06 | (2012.01) | |
| E21B 47/12 | (2012.01) | |
| G01K 1/18 | (2006.01) | |
| G01K 11/32 | (2006.01) | |

(52) U.S. Cl.
CPC .............. *E21B 47/065* (2013.01); *E21B 47/122* (2013.01); *G01K 1/18* (2013.01); *G01K 11/32* (2013.01)
USPC .............................................................. 702/6

(58) Field of Classification Search
USPC ..................................... 702/6, 11, 12; 703/10
See application file for complete search history.

(56) References Cited

U.S. PATENT DOCUMENTS

| | | | |
|---|---|---|---|
| 2,201,311 A | 5/1940 | Halliburton | |
| 2,210,417 A | 8/1940 | Kinley | |
| 2,242,161 A | 5/1941 | Athy et al. | |
| 2,739,475 A | 3/1956 | Nowak | |
| 2,803,526 A | 8/1957 | Nowak | |
| 3,480,079 A | 11/1969 | Guinn et al. | |
| 3,864,969 A | 2/1975 | Smith, Jr. | |
| 4,046,220 A | 9/1977 | Glenn, Jr. | |
| 4,330,037 A | 5/1982 | Richardson et al. | |
| 4,410,041 A | 10/1983 | Davies et al. | |
| 4,495,411 A | 1/1985 | Rashleigh | |
| 4,520,666 A | 6/1985 | Coblentz et al. | |
| 4,575,260 A | 3/1986 | Young | |

(Continued)

FOREIGN PATENT DOCUMENTS

| | | |
|---|---|---|
| CA | 2320394 A1 | 4/2001 |
| CA | 2626596 A1 | 7/2008 |

(Continued)

OTHER PUBLICATIONS

E. Oran Brigham, The Fast Fourier Transform, 1974, Prentice-Hall, pp. 50-61.*

(Continued)

*Primary Examiner* — Jonathan C Teixeira Moffat
*Assistant Examiner* — Regis Betsch
(74) *Attorney, Agent, or Firm* — Smith IP Services, P.C.

(57) ABSTRACT

Enhancing resolution of distributed optical measurements along a wellbore can include acquiring optical signals during an acquisition time period, thereby producing a convolved profile along the wellbore, and deconvolving the profile using a first function corresponding to the acquisition time period, thereby determining a second function. Another method of enhancing resolution of distributed temperature measurements along a wellbore can include acquiring optical backscatter signals during at least first and second acquisition time periods, thereby producing respective first and second convolved temperature profiles along the wellbore; deconvolving the first temperature profile using a first function corresponding to the first time period, thereby determining a second function; and deconvolving the second temperature profile using the second function, thereby determining the first function corresponding to the second time period.

16 Claims, 5 Drawing Sheets

(56) References Cited

U.S. PATENT DOCUMENTS

| | | |
|---|---|---|
| 4,641,028 A | 2/1987 | Taylor et al. |
| 4,678,865 A | 7/1987 | Sherwin |
| 4,703,175 A | 10/1987 | Salour et al. |
| 4,714,342 A | 12/1987 | Jackson et al. |
| 4,832,121 A | 5/1989 | Anderson |
| 4,845,616 A | 7/1989 | Phillips |
| 4,976,142 A | 12/1990 | Perales |
| 5,163,321 A | 11/1992 | Perales |
| 5,182,779 A | 1/1993 | D'Agostino et al. |
| 5,194,847 A | 3/1993 | Taylor et al. |
| 5,249,251 A | 9/1993 | Egalon et al. |
| 5,252,918 A | 10/1993 | VanBerg et al. |
| 5,271,675 A | 12/1993 | Fagan et al. |
| 5,303,207 A | 4/1994 | Brady et al. |
| 5,323,856 A | 6/1994 | Davis et al. |
| 5,326,969 A | 7/1994 | Fagan et al. |
| 5,380,995 A | 1/1995 | Udd et al. |
| 5,451,772 A | 9/1995 | Narendran |
| 5,488,224 A | 1/1996 | Fagan et al. |
| 5,509,474 A | 4/1996 | Cooke, Jr. |
| 5,557,406 A | 9/1996 | Taylor et al. |
| 5,610,583 A | 3/1997 | Drebika et al. |
| 5,659,142 A | 8/1997 | Lima et al. |
| 5,675,674 A | 10/1997 | Weis |
| 5,825,804 A * | 10/1998 | Sai ................... 374/137 |
| 5,862,273 A | 1/1999 | Pelletier |
| 6,003,376 A | 12/1999 | Burns et al. |
| 6,004,639 A | 12/1999 | Quigley et al. |
| 6,018,501 A | 1/2000 | Smith et al. |
| 6,026,911 A | 2/2000 | Angle et al. |
| 6,041,860 A | 3/2000 | Nazzal et al. |
| 6,072,567 A | 6/2000 | Sapack |
| 6,082,454 A | 7/2000 | Tubel |
| 6,233,374 B1 | 5/2001 | Ogle et al. |
| 6,233,746 B1 | 5/2001 | Skinner |
| 6,241,028 B1 | 6/2001 | Bijleveld et al. |
| 6,253,848 B1 | 7/2001 | Reimers et al. |
| 6,271,766 B1 | 8/2001 | Didden et al. |
| 6,281,489 B1 | 8/2001 | Tubel et al. |
| 6,302,204 B1 | 10/2001 | Reimers et al. |
| 6,367,332 B1 | 4/2002 | Fisher et al. |
| 6,380,534 B1 | 4/2002 | Farhadiroushan et al. |
| 6,408,943 B1 | 6/2002 | Schultz et al. |
| 6,437,326 B1 | 8/2002 | Yamate et al. |
| 6,443,228 B1 | 9/2002 | Aronstam et al. |
| 6,454,011 B1 | 9/2002 | Schempf et al. |
| 6,531,694 B2 | 3/2003 | Tubel et al. |
| 6,555,807 B2 | 4/2003 | Clayton et al. |
| 6,557,630 B2 | 5/2003 | Harkins et al. |
| 6,585,042 B2 | 7/2003 | Summers |
| 6,588,266 B2 | 7/2003 | Tubel et al. |
| 6,590,647 B2 | 7/2003 | Stephenson |
| 6,618,677 B1 | 9/2003 | Brown |
| 6,675,888 B2 | 1/2004 | Schempf et al. |
| 6,745,833 B2 | 6/2004 | Aronstam et al. |
| 6,751,556 B2 | 6/2004 | Schroeder et al. |
| 6,788,063 B1 | 9/2004 | Peterson et al. |
| 6,789,424 B2 | 9/2004 | Knudsen et al. |
| 6,789,621 B2 | 9/2004 | Wetzel et al. |
| 6,802,373 B2 | 10/2004 | Dillenbeck et al. |
| 6,828,547 B2 | 12/2004 | Tubel et al. |
| 6,913,079 B2 | 7/2005 | Tubel |
| 6,920,395 B2 | 7/2005 | Brown |
| 6,935,425 B2 | 8/2005 | Aronstam |
| 6,976,535 B2 | 12/2005 | Aronstam et al. |
| 6,977,367 B2 | 12/2005 | Tubel et al. |
| 6,978,832 B2 | 12/2005 | Gardner et al. |
| 6,981,549 B2 | 1/2006 | Morales et al. |
| 6,992,048 B2 | 1/2006 | Reddy et al. |
| 6,997,256 B2 | 2/2006 | Williams et al. |
| 7,000,696 B2 | 2/2006 | Harkins |
| 7,021,146 B2 | 4/2006 | Nash et al. |
| 7,040,390 B2 | 5/2006 | Tubel et al. |
| 7,055,604 B2 | 6/2006 | Jee et al. |
| 7,066,256 B2 | 6/2006 | Dillenbeck et al. |
| 7,066,284 B2 | 6/2006 | Wylie et al. |
| 7,077,200 B1 | 7/2006 | Adnan et al. |
| 7,086,484 B2 | 8/2006 | Smith, Jr. |
| 7,140,435 B2 | 11/2006 | Defretin et al. |
| 7,140,437 B2 | 11/2006 | McMechan et al. |
| 7,282,697 B2 | 10/2007 | Thomas et al. |
| 7,345,953 B2 | 3/2008 | Crickmore et al. |
| 7,430,903 B2 | 10/2008 | Ramos |
| 7,448,447 B2 | 11/2008 | Walford |
| 7,580,797 B2 * | 8/2009 | Akram et al. ................... 702/12 |
| 7,610,960 B2 | 11/2009 | Mendez et al. |
| 7,730,774 B2 | 6/2010 | Glasbergen et al. |
| 7,779,683 B2 | 8/2010 | Glasbergen et al. |
| 8,561,696 B2 | 10/2013 | Trummer et al. |
| 2002/0040963 A1 | 4/2002 | Clayton et al. |
| 2002/0122176 A1* | 9/2002 | Haas et al. ................... 356/326 |
| 2003/0020631 A1 | 1/2003 | Haase et al. |
| 2003/0145654 A1 | 8/2003 | Knudsen et al. |
| 2003/0166470 A1 | 9/2003 | Fripp et al. |
| 2003/0173959 A1 | 9/2003 | Paulson et al. |
| 2003/0192692 A1 | 10/2003 | Tubel |
| 2003/0192695 A1 | 10/2003 | Dillenbeck et al. |
| 2003/0205083 A1 | 11/2003 | Tubel et al. |
| 2003/0236626 A1 | 12/2003 | Schroeder et al. |
| 2004/0033017 A1 | 2/2004 | Kringlebotn et al. |
| 2004/0040707 A1 | 3/2004 | Dusterhoft et al. |
| 2004/0069069 A1 | 4/2004 | Gysling et al. |
| 2004/0084180 A1 | 5/2004 | Shah et al. |
| 2004/0109228 A1 | 6/2004 | Aronstam |
| 2005/0120796 A1 | 6/2005 | Nash et al. |
| 2005/0149264 A1 | 7/2005 | Tarvin et al. |
| 2006/0010973 A1 | 1/2006 | Brown |
| 2006/0109746 A1 | 5/2006 | Crickmore et al. |
| 2006/0133203 A1 | 6/2006 | James et al. |
| 2006/0165344 A1 | 7/2006 | Mendez et al. |
| 2006/0283266 A1 | 12/2006 | Qing et al. |
| 2007/0126594 A1 | 6/2007 | Atkinson et al. |
| 2007/0234788 A1 | 10/2007 | Glasbergen et al. |
| 2007/0234789 A1 | 10/2007 | Glasbergen et al. |
| 2007/0283751 A1* | 12/2007 | Van Der Spek ............. 73/152.33 |
| 2007/0289740 A1 | 12/2007 | Thigpen et al. |
| 2008/0068586 A1 | 3/2008 | Kishida et al. |
| 2008/0088846 A1 | 4/2008 | Hayward et al. |
| 2008/0262737 A1 | 10/2008 | Thigpen et al. |
| 2009/0034368 A1 | 2/2009 | Johnson |
| 2009/0114386 A1 | 5/2009 | Hartog et al. |
| 2009/0132183 A1 | 5/2009 | Hartog et al. |
| 2009/0173494 A1* | 7/2009 | Tarvin et al. ............. 166/250.15 |
| 2009/0277629 A1 | 11/2009 | Mendez et al. |
| 2009/0326826 A1 | 12/2009 | Hull et al. |
| 2010/0038079 A1 | 2/2010 | Greenaway |
| 2010/0122813 A1 | 5/2010 | Trummer et al. |
| 2011/0002795 A1 | 1/2011 | Brookbank |
| 2011/0088462 A1 | 4/2011 | Samson et al. |
| 2011/0090496 A1 | 4/2011 | Samson et al. |
| 2011/0280103 A1 | 11/2011 | Bostick, III |
| 2012/0013893 A1 | 1/2012 | Maida et al. |
| 2012/0014211 A1 | 1/2012 | Maida, Jr. et al. |
| 2012/0046866 A1 | 2/2012 | Meyer et al. |
| 2012/0111560 A1 | 5/2012 | Hill et al. |
| 2013/0233537 A1 | 9/2013 | McEwen-King et al. |

FOREIGN PATENT DOCUMENTS

| | | |
|---|---|---|
| EA | 002374 B1 | 4/2002 |
| EP | 1464204 A1 | 12/2002 |
| EP | 1355166 A2 | 10/2003 |
| EP | 1355169 A2 | 10/2003 |
| EP | 1357401 A2 | 10/2003 |
| EP | 1468258 A2 | 10/2004 |
| EP | 1464204 B1 | 4/2005 |
| EP | 1563323 B1 | 3/2007 |
| EP | 1466138 B1 | 4/2009 |
| EP | 1468258 B1 | 4/2010 |
| GB | 2230086 A | 10/1990 |
| GB | 2362462 A | 11/2001 |
| GB | 2364380 A | 1/2002 |
| GB | 2364381 A | 1/2002 |
| GB | 2364384 A | 1/2002 |

(56) References Cited

FOREIGN PATENT DOCUMENTS

| | | | |
|---|---|---|---|
| GB | 2384108 A | 7/2003 |
| GB | 2384313 A | 7/2003 |
| GB | 2384644 A | 7/2003 |
| GB | 2386625 A | 9/2003 |
| GB | 2386687 A | 9/2003 |
| GB | 2397648 A | 7/2004 |
| GB | 2408327 A | 5/2005 |
| GB | 2408328 A | 5/2005 |
| GB | 2408329 A | 5/2005 |
| GB | 2408531 A | 6/2005 |
| RU | 1294985 A | 3/1987 |
| RU | 2341652 C1 | 12/2008 |
| WO | 9609561 A1 | 3/1996 |
| WO | 9850681 A1 | 11/1998 |
| WO | 03021301 A2 | 3/2003 |
| WO | 03042498 A1 | 5/2003 |
| WO | 03059009 A1 | 7/2003 |
| WO | 03062750 A1 | 7/2003 |
| WO | 03062772 A2 | 7/2003 |
| WO | 03081186 A2 | 10/2003 |
| WO | 03062772 A3 | 12/2003 |
| WO | 03081186 A3 | 12/2003 |
| WO | 03106940 A1 | 12/2003 |
| WO | 2004020774 A2 | 3/2004 |
| WO | 2004020789 A2 | 3/2004 |
| WO | 2004020790 A2 | 3/2004 |
| WO | 2004042425 A1 | 5/2004 |
| WO | 2004042425 A8 | 8/2004 |
| WO | 2004085795 A1 | 10/2004 |
| WO | 2004094961 A1 | 11/2004 |
| WO | 2004114487 A1 | 12/2004 |
| WO | 2005035943 A1 | 4/2005 |
| WO | 2005064117 A1 | 7/2005 |
| WO | 2005116388 A1 | 12/2005 |
| WO | 2008098380 A1 | 8/2008 |
| WO | 2008119951 A2 | 10/2008 |
| WO | 2008119951 A3 | 11/2009 |
| WO | 2010020781 A1 | 2/2010 |
| WO | 2010020795 A1 | 2/2010 |
| WO | 2010020796 A1 | 2/2010 |

OTHER PUBLICATIONS

Office Action issued Sep. 26, 2008, for U.S. Appl. No. 11/398,503, 23 pages.

Office Action issued Apr. 14, 2009, for U.S. Appl. No. 11/398,503, 9 pages.

Office Action issued Dec. 5, 2006, for U.S. Appl. No. 11/398,503, 8 pages.

Office Action issued Jan. 12, 2008, for U.S. Appl. No. 12/167,884, 16 pages.

Office Action issued Jan. 13, 2008, for U.S. Appl. No. 12/167,910, 16 pages.

Office Action issued Apr. 6, 2010, for U.S. Appl. No. 12/167,910, 15 pages.

Office Action issued Nov. 29, 2007, for U.S. Appl. No. 11/398,483, 20 pages.

Office Action issued Dec. 14, 2007, for U.S. Appl. No. 11/398,483, 3 pages.

Sierra, Jose; Kaura, Jiten; Welldynamics; Gualtieri, Dan; Glasbergen, Gerard; Sarkar, Diptadhas; Halliburton; Johnson, David; Digital Ascension; "DTS Monitoring Data of Hydraulic Fracturing: Experiences and Lessons Learned", SPE 116182, dated 2008, 15 pages.

Horn, R.N.; Stanford U; Perrick, J.L.; Pruett Indurstries Inc.; and Barua, J.; "The Use of Microcomputers in Well Test Data Acquisition and Analysis", SPE 15308, dated 1986, 9 pages.

Soliman, M.Y.; Halliburton; "Technique for Considering Fluid Compressibility and Temperature Changes in Mini-Frac Analysis", SPE 15370, dated 1986, 11 pages.

Lee, W.S.; Halliburton; "Study of the Effects of Fluid Rheology on Minifrac Analysis", SPE 16916, dated 1987, 10 pages.

Bjornstad, B.: Norge, Alcatel Kabel; Kvisteroy, T.; Sensonor AS; Eriksrud, M.; "Fibre Optic Well Monitoring System", SPE 23147, dated 1991, 8 pages.

Cleary, M.P.; Massachusetts Inst. of Technology; Johnson, D.E.; Resources Engineering Systems Inc.; Kogsbell, H-H.; Owens, K.A.; Maersk Olie & Gas A.S.; Perry, K.F.; Gas Research Inst.; Pater, C.J. de; Delft U. of Technology; Stachel, Alfred; Schmidt, Holger; RWE-DEA Akitiengesellschaft Fur Mineraloel & Chemie; Tambini, Mauro; AGIP SPA; "Field Implementation of Proppant Slugs to Avoid Premature Screen-Out of Hydraulic Fractures with Adequate Proppant Concentration", SPE 25892, 1993.

Botto, Giovanni; Maggioni, Bruno; Schenato, Adelmo; AGIP SPA; "Electronic, Fiber-Optic Technology: Future Options for Permanent Reservoir Monitoring", SPE 28484, dated 1994, 10 pages.

Karaman, Osama S.; Chevron Use Production Company, Inc.; Kutlik, Roy L.; Chevron Research and Technology Company; Kluth, Ed L.; Sensor Dynamics Ltd.; "A Field Trial to Test Fiber Optice Sensors for Downhole Temperature and Pressure Measurements, West Coalinga Field, California", SPE 35685, dated 1996, 7 pages.

Saputelli, Luigi; Mendoza, Humberto; Finol, Jose; Rojas, Luis; Lopez, Elias; Bravo, Heriberto; Buitriago, Saul; PDVSA Exploration y Production; "Monitoring Steamflood Performance through Fiber Optic Temperature Sensing", SPE 54104, dated 1999, 7 pages.

Carnahan, B.D.; Clanton, R.W.; Koehler, K.D.; AERA Energy LLC; Harkins, G.O.; Williams, G.R.; Sensor Highway; "Fiber Optic Temperature Monitoring Technolgoy", SPE 54599, dated 1999, 10 pages.

Eriksson, Klas; ABB Corporate Research AS; "Fibre Optic Sensing—Case of 'Solutions Looking for Problems'", SPE 71829, dated Sep. 4-7, 2001, 5 pages.

Callison, Dave; Jones, Joe; Occidental of Eolk Hills, Inc.; Shelley, Bob; Lockman, Rusty; Hallibruton; "Integrated Modeling of a Field of Wells—An Evaluation of Western Shallow Oil Zone Completion Practices in the Elk Hills Feild, Kern County, California", SPE 76724, dated May 20-22, 2002, 10 pages.

Corbett, Gary; Fagervik, Egil; Christie, Stewart; Smith, Bob; Falcon, Keith; "Fiber Optic Monitoring in Openhole Gravel Pack Completions", SPE 77682, dated Sep. 29-Oct. 2, 2002, 14 pages.

Brown, George A.; Hartog, Arthur; Slumberger; "Optical Fiber Sensors in Upstream Oil & Gas", SPE 79080, dated Nov. 2002, 3 pages.

Brown, G.; Storer, D.; McAlliser, K; Raghaven, K.; "Monitoring Horizontal Producers and Injectors During Cleanup and Production Using Fiber-Optic-Distributed Temperature Measurements", SPE 84379, dated Oct. 5-8, 2003, 6 pages.

Johnson, D.O.; Sugianto, R.; Mock, P.H.; Jones, C.H.; "Identification of Steam-Breakthrough Interval with DTS Technology", SPE 87631, Dec. 9, 2003, 8 pages.

Foucault, H.; Poilleux, D.; Djurisic, A.; Slikas, M.; Strand, J.; Silva, R.; "A Successful Experience for Fiber Optic and Water Shut Off on Horizontal Wells with Slotted Liner Completion in an Extra Heavy Oil Field" SPE 89405, dated Apr. 17-21, 2004, 6 pages.

Hasebe, Brant; Hall, Dr. Andrew; Smith, Bruce; Brady, Jerry; Mehdizadeh, Dr. Parviz; "Feild Qualification of Four Multiphase Flowmeters on North Slop, Alaska", SPE 90037, Sep. 26-29, 2004, 13 pages.

Bond, Andy; Blount, Curt; Kragas, Tor; Mathias, Steve; "Use of a Fiber Optic Pressure/ Temperature guage in An Exploration Well to Minimize Formation Damage Potential and Reduce Costs During Production Testing", SPE 90130, dated Sep. 26-29, 2004, 10 pages.

Ouyang, Liang-Biao; Belanger, Dave; Cheveron Texaco Energy Technology Company; "Flow Profiling via Distributed Temperature Sensor (DTS) System—Expectation and Reality", SPE 90541, dated Sep. 26-29, 2004, 14 pages.

Nath, D.K.; Halliburton; "Fiber Optics Used to Support Reservoir Temperature Surveillance in Duri Steamflood", SPE 93240, dated Apr. 5-7, 2005, 9 pages.

Glasbergen, G.; Batenburg, D. van; Domelen, M. van; Gdanski, R.; "Field Validation of Acidizing Wormhole Models", SPE 94695, May 25-27, 2005, 11 pages.

Brown, G.; Carvalho, V.; Wray, A.; Sanchez, A.;Guiterrez, G.; "Slickline With Fiber-Optic Distributed Temperature Monitoring for Water-Injection and Gas Lift Systems Optimization in Mexico", dated Jun. 20-23, 2005, 10 pages.

(56) References Cited

OTHER PUBLICATIONS

Yoshioka, K.; Zhu, D.; Hill, A.D.; Dawkrajai, P.; L.W. Lake; "A Comprehensive Model of Temperature Behavior in a Horizontal Well", SPE 95656, dated Oct. 9-12, 2005, 15 pages.
Gao, G.; Jalali, Y.; "Interpretation of Distributed Temperature Data During Injection Period in Horizontal Wells", SPE 96260, dated Oct. 9-12, 2005, 8 pages.
Pimenov, V.; Brown, G.; Shandrygin, A.; Popov, Y.; "Injectivity Profiling in Horizontal Wells Through Distributed Temperature Monitoring", SPE 97023, Oct. 9-12, 2005, 8 pages.
Nath, D.K.; Sugianto, Riki; Finley, Doug; "Fiber-Optic Distributed Temperature Sensing Technology Used for Reservoir Monitoring in an Indonesia Steam Flood", SPE 97912, dated Nov. 1-3, 2006, 10 pages.
Clanton, R.W.; Haney, J.A.; Wahl, C.L.; Goiffon, J.J.; Gualtieri, D.; "Real-Time Monitoring of Acid Stimulation Using a Fiber-Optic DTS System", SPE 100617, dated May 8-10, 2006, 10 pages.
Johnson, D.; Sierra, J.; Kaura, J.; Gualtieri; "Successful Flow Profiling of gas Wells Using Distributed Temperature Sensing Data", SPE 103097, dated Septemeber 24-27, 2006, 16 pages.
Glasbergen, Gerard; Gualtieri, Dan; Van Domelen, Mary; Sierra, Jose; "Real-Time Fluid Distribution Determination in Matrix Treatments Using DTS", SPE 107775, dated May 30-Jun. 1, 2007, 16 pages.
Glasbergen, Gerard; Gualtieri, Dan; Trehan, Rakesh; Van Domelen, Mary; Nelson, Micky; "Real-Time Time Diversion Quantification and Optimization Using DTS", SPE 110707, dated Nov. 11-14, 2007, 17 pages.
Zhang, Lei; Feng, Xue; Zhang, Wei; Liu, Xiaoming, "Improving Spatial Resolution in Fiber Raman Distributed Temperature Sensor by Using Deconvolution Algorithm", Chinese Optics Letters, vol. 7, No. 7, dated Jul. 10, 2009, 4 pages.
John Fagley, et al, "An Improved Simulation for Interpreting Temperature Logs in Water Injection Wells", dated Oct. 1982, 10 pages.
American Petroleum Institute, "Temperature Surveys; The Art of Interpretation", Horace Kading, John S. Hutchings; dated Mar. 1969, 20 pages.
Geothermal Resources Council Transactions, "Temperature Profile Monitoring in Geothermal Wells by Distributed Temperature Sensing Technique", vol. 19, Oct. 1995, 4 pages.
J. Henninges, et al., "Fibre-optic Temperature Measurements in Boreholes", dated Oct. 2003, 9 pages.
Halliburton, "StimWatch Stimulation Monitoring Service", dated 2006, 4 pages.
Terry Knott, "Wytch Farm Sees the Light", Oil Online, dated Dec. 1, 2000, 6 pages.
The Oil and Gas Journal, "Shut-in Temperature Profiles Tell Where the Water Went", Horace Kading, dated May 1968, 3 pages.
Schlumberger, Oilfield Glossary, "Joule-Thomson", dated Mar. 2006, 1 page.
Halliburton, "Reservoir Performance Monitoring", dated Nov. 2005, 2 pages.
Petroleum Transactions, "The Estimation of Water Injection Profiles from Temperature Surveys", T.J. Nowak, dated 1953, 10 pages.
World Geothermal Congress, "Temperature Logging by the Distributed Temperature Sensing Technique during Injection Tests", pp. 1657-1661, dated Jun. 2000, 5 pages.
Stephan Großwig, et al., "Distributed Fibre Optical Temperature Sensing Technique—A Variable Tool for Monitoring Tasks," Proceedings of the 8th International Symposium on Temperature and Thermal Measurements in Industry and Science, dated Jun. 2001, 9 pages.
Eckart Hurtig, et al., "Fibre Optic Temperature Measurements", Terrastock 2000, dated Aug.-Sep. 2000, 9 pages.
World Geothermal Congress, "Delineation of Fractured Reservoir by Transient Temperature Analysis Using Fiber Optic Sensor", pp. 2617-2621, dated Jun. 2000, 5 pages.
Halliburton, "The Impact of Wellbore Phenomena on Fluid Placement and Zonal Coverage," Gerard Glasbergen, undated, 9 pages.
Oxy Elk Hills, "Using Fiber Optics to Divert Acid on the Fly in the Monterey Shale", Ray Clanton, undated, 46 pages.
Pruett Industries, "Fiber Optic Distributed Temperature Sensor 'DTS'", undated, 51 pages.
Wikipedia, Convolution, web archive, dated Jun. 23, 2010, 14 pages.
Prof. Tom O'Haver, Deconvolution, web archive, dated Jul. 14, 2008, 3 pages.
Ikeda, Fractured Reservoir Management by Fiber Optic Distribution Temperature Measurement, dated Sep. 27-28, 2000, 6 pages.
Office Action issued Apr. 15, 2013 for U.S. Appl. No. 12/838,736, 86 pages.
Russian Office Action issued Jun. 10, 2013 for Russian Patent Application No. 2013107010/20(010445), 3 pages.
Office Action issued Jul. 1, 2013 for U.S. Appl. No. 12/838,726, 23 pages.
International Search Report with Written Opinion issued Dec. 13, 2012 for PCT Patent Application No. PCT/GB11/001068, 12 pages.
International Search Report with Written Opinion issued Jan. 30, 2013 for PCT Patent Application No. PCT/GB11/001085, 12 pages.
Office Action issued Feb. 28, 2013 for U.S. Appl. No. 12/838,726, 62 pages.
Specification and Drawings filed Aug. 9, 2013 for U.S. Appl. No. 13/963,563, 42 pages.
Office Action issued Jan. 16, 2014 for U.S. Appl. No. 14/033,304, 11 pages.
Office Action issued Mar. 14, 2014 for Russian Patent Application No. 2013107011, 3 pages.
English translation of Office Action issued Mar. 14, 2014 for Russian Patent Application No. 2013107011, 4 pages.
Examination Report issued May 7, 2014 for Australian Patent Application No. 2011281373, 3 pages.
English Abstract of Russian publication No. RU2341652, retrieved May 20, 2014 from http://worldwide.espacenet.com/publicationDetails/biblio?DB=EPODOC&II=0&ND=3&adjacent=true&locale=en_EP&FT=D&date=20081220&CC=RU&NR=2341652C1&KC=C1, 1 page.
English abstract of Eurasian Patent Organization publication No. EA002374, retrieved May 20, 2014 from http://worldwide.espacenet.com/publicationDetails/biblio?DB=EPODOC&II=0&ND=3&adjacent=true&locale=en_EP&FT=D&date=20020425&CC=EA&NR=002374B1&KC=B1, 1 page.
Office Action issued Jul. 17, 2014 for U.S. Appl. No. 14/033,304, 44 pages.

* cited by examiner

RESOLUTION ENHANCEMENT FOR SUBTERRANEAN WELL DISTRIBUTED OPTICAL MEASUREMENTS

BACKGROUND

This disclosure relates generally to equipment utilized and operations performed in conjunction with a subterranean well and, in an example described below, more particularly provides resolution enhancement for distributed optical measurements.

Distributed temperature sensing (DTS) is a technology that can be used to measure temperature distribution along an optical waveguide (such as an optical fiber, optical ribbon, etc.). A pulsed laser source is used to send a pulse of light through the optical waveguide, and properties of returning light are recorded. The returning light, "backscatter," comprises absorption and retransmission of light energy.

The backscattered light includes different spectral components, e.g., Rayleigh, Brillouin, and Raman bands. The Raman band can be used to obtain temperature information along the fiber.

The Raman backscatter has two components, Stokes and Anti-Stokes, the former being weakly dependent on temperature and the latter being greatly influenced by temperature. The relative intensity between the Stokes and Anti-Stokes components is a function of temperature at which the backscattering occurs.

Since the speed of light in glass is known, it is possible to determine, by tracking the arrival time of the reflected and backscattered light, the precise location where the backscattered light originated. A DTS trace or profile is a set of temperature measurements or sample points, equally spaced along the waveguide length.

Every sample point represents the average temperature along a length section called a "sampling interval," and during a period of time called "acquisition time." The sampling interval is usually about 1 meter and the measurement time can range from a few seconds to several minutes, and even hours.

Unfortunately, in high flow rate circumstances (such as during fracturing, injection, other stimulation operations, gas production, etc.), fluid can travel a substantial distance over a short period of time. Thus, it will be appreciated that conventional methods of distributed temperature measurement for tracking fluid movement along a wellbore could be improved.

Such improvements would be useful in situations where temperature profiles change significantly in a short timespan, for example, where it is desired to track a thermal tracer which is displacing at a relatively high velocity. The long measurement times used in conventional DTS systems cannot provide sufficiently high resolution to track high velocity events.

Other optical measurement techniques, such as distributed acoustic sensing (DAS), distributed vibration sensing (DVS), etc., could also benefit from improvements in measurement resolution.

SUMMARY

In the disclosure below, systems and methods are provided which bring improvements to the art of distributed optical measurement for subterranean wells. One example is described below in which a resolution of such distributed optical measurements is increased. Another example is described below in which a thermal tracer can be more readily tracked along a wellbore.

In one aspect, the present disclosure provides to the art a method of enhancing resolution of distributed optical measurements along a wellbore. The method can include the steps of: acquiring optical signals during at least one acquisition time period, thereby producing a convolved profile along the wellbore; and deconvolving the profile using a first function corresponding to the acquisition time period, thereby determining a second function.

In another aspect, the disclosure provides a method of enhancing resolution of distributed temperature measurements along a wellbore. The method can include the steps of: acquiring optical backscatter signals during at least two acquisition time periods, thereby producing respective convolved temperature profiles along the wellbore; deconvolving the first temperature profile using a first function corresponding to the first acquisition time period, thereby determining a second function; and deconvolving the second temperature profile using the second function, thereby determining the first function corresponding to the second acquisition time period.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Figure 1:
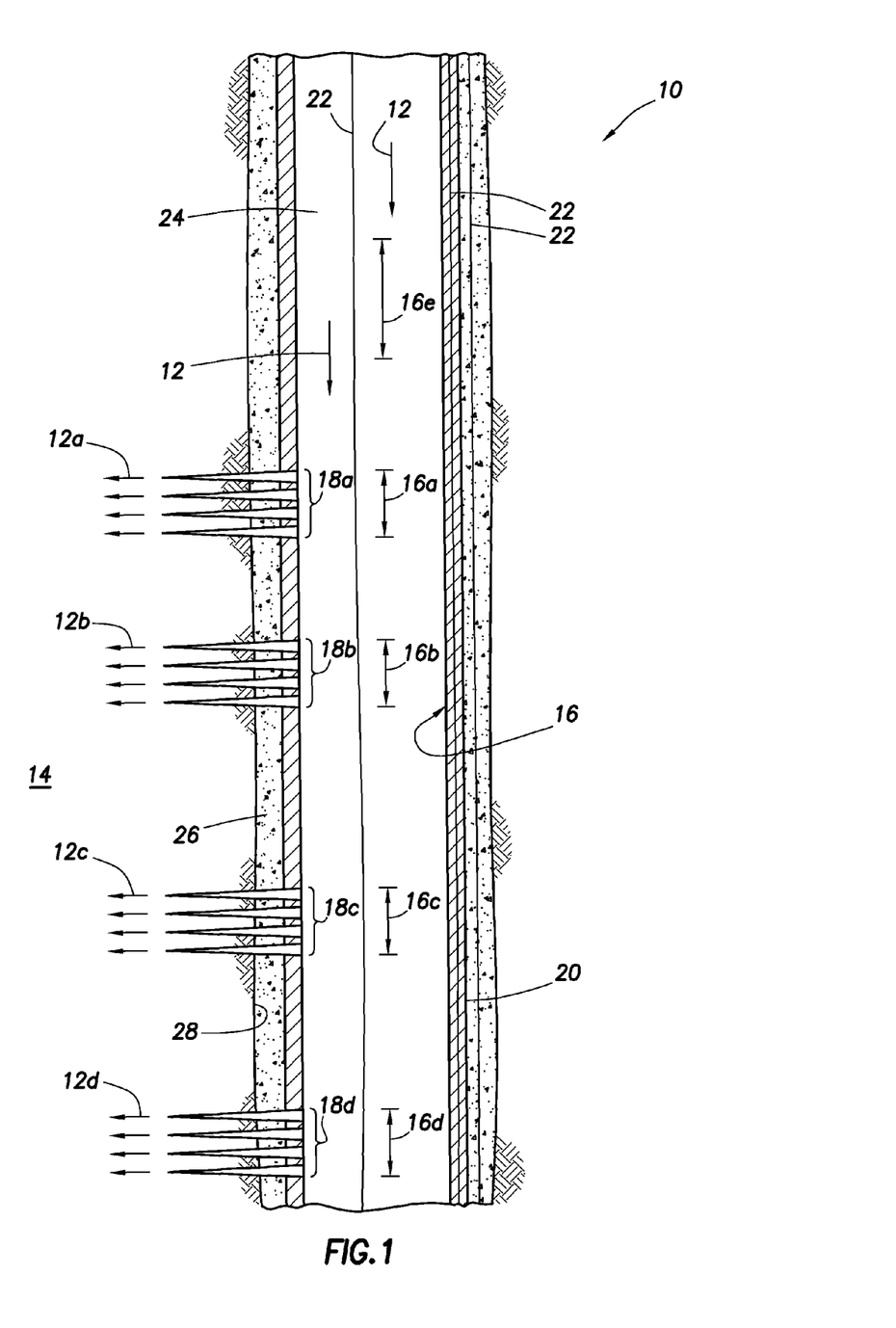
FIG. 1 is a schematic cross-sectional view of a well system and associated method which can embody principles of the present disclosure.

Representatively illustrated in FIG. 1 is a well system 10 and associated method which can embody principles of this disclosure. In the well system 10, a fluid 12 is injected into a formation 14 surrounding a wellbore 16. The fluid 12 enters the formation 14 via sets of perforations 18a-d formed through casing 20 at respective sections 16a-d of the wellbore.

It is useful to know the proportions of fluid 12 which enter each of the sets 18a-d of perforations in real time, for example, to evaluate the effectiveness of the injection operation, to enable the operation to be adjusted if needed, etc. For this purpose, one or more optical waveguides 22 are positioned along the wellbore 16.

As depicted in FIG. 1, an optical waveguide 22 is positioned in an interior 24 of the wellbore 16, another optical waveguide is positioned in a sidewall of the casing 20, and another optical waveguide is positioned in an annulus 26 formed radially between the casing and a wall 28 of the formation 14. These various positions are illustrated in FIG. 1 to show that the optical waveguide 22 can be located in any position in the wellbore 16 in keeping with the principles of this disclosure, but in practice a single optical waveguide may be located in only one of the illustrated positions (or in another position not shown in FIG. 1).

The optical waveguide 22 may be incorporated as part of a cable having additional components, such as armor, insulation, cladding, electrical lines, hydraulic lines and/or shielding, etc. The optical waveguide 22 may be installed in a tube or control line. Thus, it should be appreciated that any manner of installing the optical waveguide 22 in the well may be used in keeping with the principles of this disclosure.

In the example of FIG. 1, the optical waveguide 22 is used for DTS monitoring during the injection operation. However, other distributed optical measurement techniques may be used, if desired. For example, distributed acoustic sensing (DAS) or distributed vibration sensing (DVS) may be used.

As discussed above, Raman backscatter sensing is typically used for DTS monitoring, but Brillouin backscatter sensing can also be used, if desired. Brillouin or Rayleigh backscatter sensing may be used for DAS or DVS monitoring, with preferably Brillouin backscatter gain or coherent Rayleigh backscatter being sensed.

Although an injection operation is depicted as being performed in the well system 10 of FIG. 1, it should be clearly understood that the principles of this disclosure are not limited to injection operations, or to any of the other details of the well system 10. Instead, the principles of this disclosure may also be used for production operations, for detecting fluid flow along the annulus 26 (e.g., to detect cross-flow between zones or formations, etc.), or for any other purpose or type of operation.

DTS measurement technology can be used in oil and gas wells for the assessment of flow contribution or injection distribution from/to commingled reservoirs over the life of a well. Flow profiling (determining the amount of flow into or from each interval or zone of a well) is a useful tool to assess reservoir performance and can be used to exercise effective reservoir management. This is a key component to understanding reservoir depletion, cross-flow into different reservoir layers and other near-wellbore effects.

In the past, production logging tools (PLT) were major sources of the above information, and were used to determine flow allocation from each reservoir layer for effective reservoir management. More recently, DTS data modeling capabilities have allowed the temperature profile in an oil, gas or water well to be accurately determined during a production or injection operation.

Better visualization tools and flow analysis techniques allow capturing transient events, which have provided better visualization of the sequence of events. For example, see Johnson, D. O., et al., "Successful Flow Profiling of Gas Wells Using Distributed Temperature Sensing Data," SPE 103097, 2006. As a result, there is a wide acceptance of DTS technology as a viable method for performing flow profiling, especially in gas wells.

Unfortunately, when DTS techniques are used to record temperature profiles, the resulting temperature profiles are averages of multiple thousands of "instantaneous" temperature profiles acquired during the acquisition time period. A single acquired DTS temperature profile is therefore a convolution of the instantaneous temperature profiles during the acquisition time period.

If a "thermal tracer" (a temperature anomaly, such as a temperature change, high or low temperature spike, etc., which can be distinguished from the temperature of the environment) is used, the position of the thermal tracer can be identified by its characteristic thermal profile which is part of the overall DTS temperature profile. By noting the change in position of the thermal tracer at different acquisition time periods, a velocity of the thermal tracer along the wellbore 16 can be determined.

However, during each acquisition time period (typically 10 seconds up to several minutes), the thermal tracer travels along the well at the velocity of the fluid 12. The instantaneous temperature profiles would indicate the velocity of the thermal tracer very accurately, if they could be known. The DTS temperature profile is not as accurate, because it is an average of the instantaneous profiles.

Figure 2:
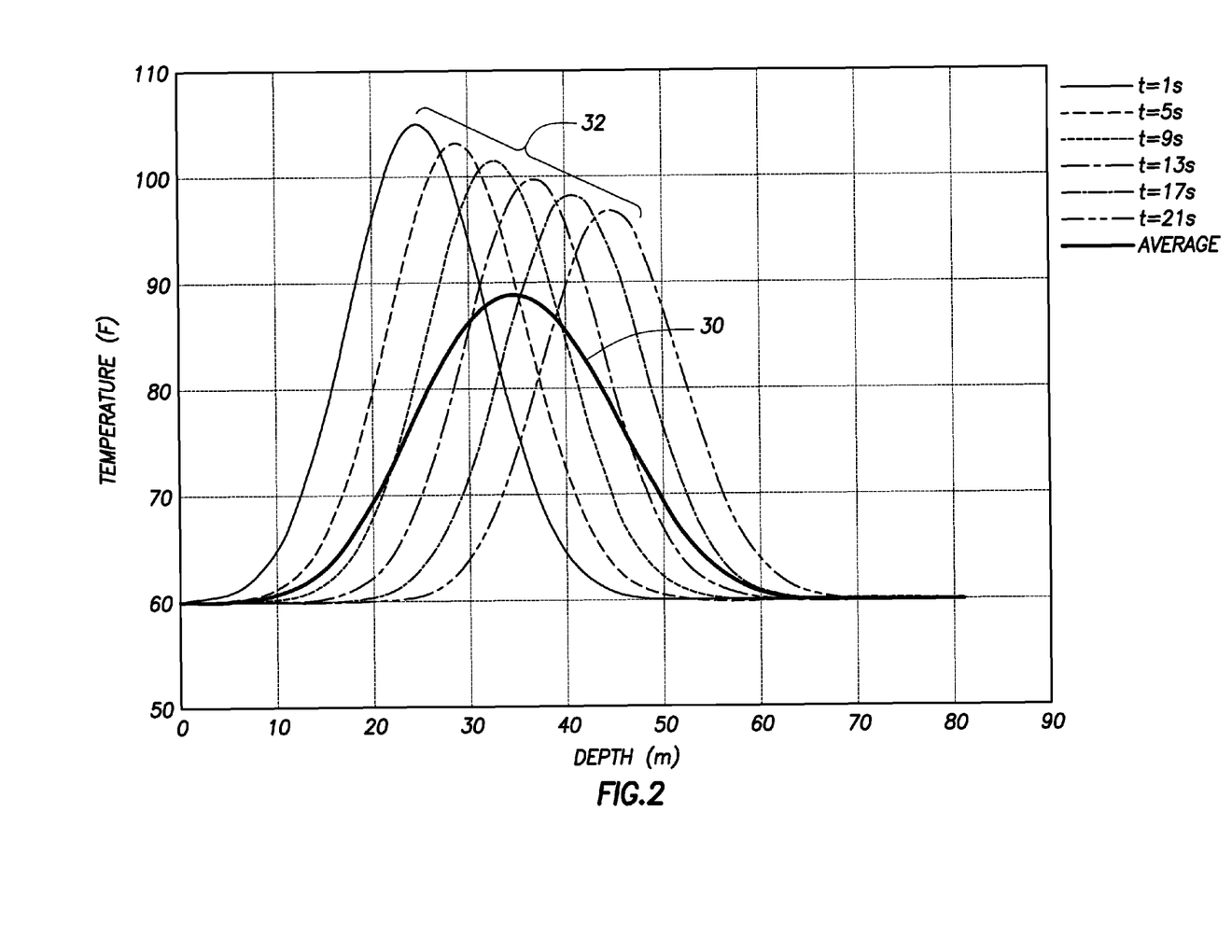
FIG. 2 is a graph of an example DTS temperature profile and example individual instantaneous temperature profiles from which the DTS temperature profile is convolved.

Referring additionally now to FIG. 2, it may be seen that a DTS temperature profile 30 acquired during an acquisition time period of 22 seconds is an average of many individual instantaneous temperature profiles 32 (only six of which are depicted in FIG. 2). The instantaneous temperature profiles 32 are not known in actual practice, but are used in the example of FIG. 2 to demonstrate how the DTS temperature profile 30 results from the thousands of instantaneous temperature profiles of a DTS measurement technique.

The DTS temperature profile 30 in FIG. 2 indicates that a temperature spike is present at about 35 meters depth during the acquisition time period, but the instantaneous temperature profiles 32 would more precisely indicate the exact position of the temperature spike, the exact temperature along the wellbore 16, and the velocity of the fluid 12 and thermal tracer during the acquisition time period.

The acquired DTS temperature profile 30 is a convolution of the instantaneous temperature profiles 32, with the convolution being a result of the shapes of the individual temperature profiles and their velocity along the wellbore 16. Thus, the acquired DTS temperature profile 30 actually contains information relating to the velocity of the fluid 12 (and any changes therein) during the acquisition time, although this information is not readily apparent from observing the temperature profile itself.

Instead, the information is contained in the shape of the acquired DTS temperature profile 30, and changes in the shape between consecutive DTS temperature profiles do, therefore, contain information regarding any changes in fluid velocity. Note that the fluid velocity at a given depth in the wellbore 16 can change due to changes in surface injection/production rates, changes in the flowpath or wellbore 16 geometry, fluid leaking (injection) out of or entering (production) into the wellbore, wellbore storage, etc.

The principles described herein provide for determining the changes in fluid velocity due to fluid 12 leaking from or entering into the wellbore 16. In one feature of a method described herein, the "instantaneous" temperature profiles 32 are deconvolved from the acquired DTS temperature profile 30 to obtain the fluid velocity information and therefore determine the injection/production flow profile during the acquisition time period. The same concept can be applied to other types of distributed optical measurements, such as DAS and DVS (in which cases, acoustic or vibration profiles would be used, instead of temperature profiles).

Using the principles described more fully below, an accurate, quick and easy method can be practiced to determine the injection or production flow distribution along a wellbore. An example is described using a number of DTS temperature profiles that track a thermal tracer at respective different acquisition time periods.

Implementation of this method allows the determination of the injection/production flow distribution by deconvolution of the DTS temperature profiles, even in challenging conditions such as high rate flow, long acquisition times and short distances between consecutive flowing zones. This method can even be used by non-experts and will therefore allow for extensive application of flow profiling using DTS.

In mathematics and, in particular, functional analysis, convolution is a mathematical operation on two functions f and g, producing a third function that is typically viewed as a modified version of one of the original functions. Convolution is similar to cross-correlation.

The convolution of f and g is written f*g, using an asterisk or star. It is defined as the integral of the product of the two functions after one is reversed and shifted. The convolution h of functions f and g is mathematically expressed as:

$$h(t) = (f*g)(t) = \int_0^t f(\tau)g(t-\tau)d\tau \quad (1)$$

In the present case, one of the functions f, g preferably describes the shape of the thermal tracer temperature profile, and the other function preferably describes the velocity of the fluid 12 and thermal tracer along the wellbore 16.

If one of the functions f, g is known, then the convolution h (the DTS temperature profile) can be readily deconvolved to determine the other function. Deconvolution is the converse of convolution in the sense that division is the converse of multiplication. In fact, the deconvolution of one signal from another is usually performed by dividing the two signals in the Fourier domain.

The practical significance of deconvolution is that it can be used as an artificial (i.e., computational) way to reverse the result of a convolution occurring in the physical domain. Deconvolution algorithms are incorporated into readily available mathematics solution providers, such as the MATLAB™ software package available from The Mathworks, Inc. of Natick, Mass., USA.

Figure 3:
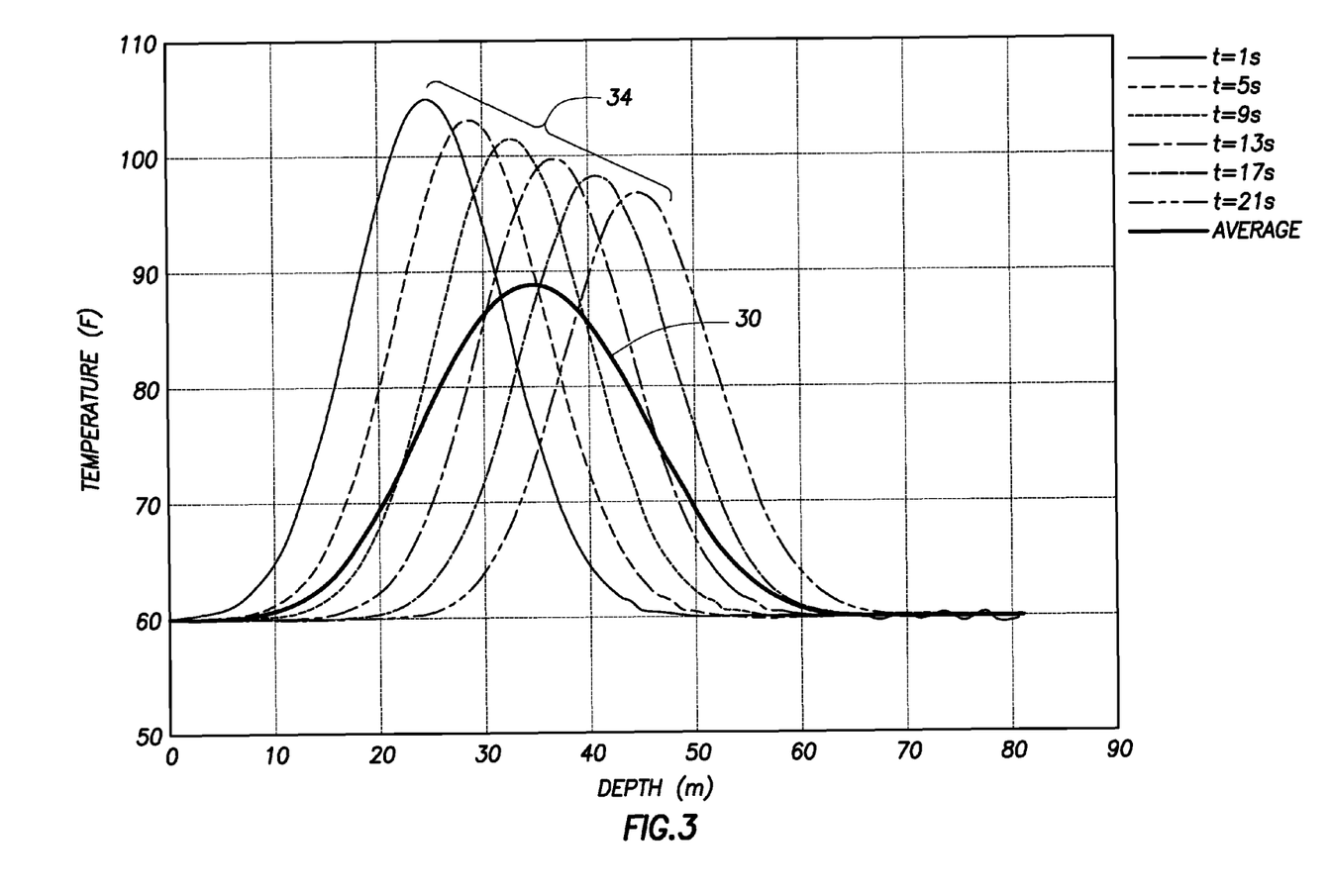
FIG. 3 is a graph of the DTS temperature profile and individual temperature profiles which result from deconvolving the DTS temperature profile.

Referring additionally now to FIG. 3, the DTS temperature profile 30 of FIG. 2 has been deconvolved into individual temperature profiles 34. Note the similarity of the deconvolved temperature profiles 34 to the instantaneous temperature profiles 32 of FIG. 2. This demonstrates that the deconvolution technique is valid for distilling the information present in the DTS temperature profile 30.

In a method embodying principles of this disclosure, a DTS temperature profile is acquired during an acquisition time period in which the velocity of the fluid 12 is accurately known. For example, in the well system 10, the acquisition time period could be when the thermal tracer traverses a section 16e of the wellbore where the geometry of the wellbore 16 and the flowpath for the fluid 12 are well known, and while the pumping rate of the fluid is also well known. From this information, the velocity of the fluid 12 through the wellbore section 16e can be readily determined.

The DTS temperature profile acquired during the acquisition time period is deconvolved using the known velocity as one of the functions f, g. The deconvolution yields the other function, which is the shape of the instantaneous temperature profiles from which the DTS temperature is convolved.

DTS temperature profiles are also acquired during acquisition time periods in which the velocity of the fluid 12 changes, such as while the thermal tracer traverses wellbore sections 16a-d. Using the shape information determined as discussed above, these DTS temperature profiles are deconvolved. The deconvolution yields the other function, which is the velocity of the thermal tracer during each of the acquisition time periods.

Note that it is not necessary for the acquisition time period in which the velocity of the fluid 12 is known to be earlier in time as compared to the acquisition time periods in which the velocity of the fluid is unknown. For example, in production operations, the velocity of a commingled fluid mixture may be known after fluids with unknown velocities have been received into a wellbore from multiple zones or intervals.

Figure 4:
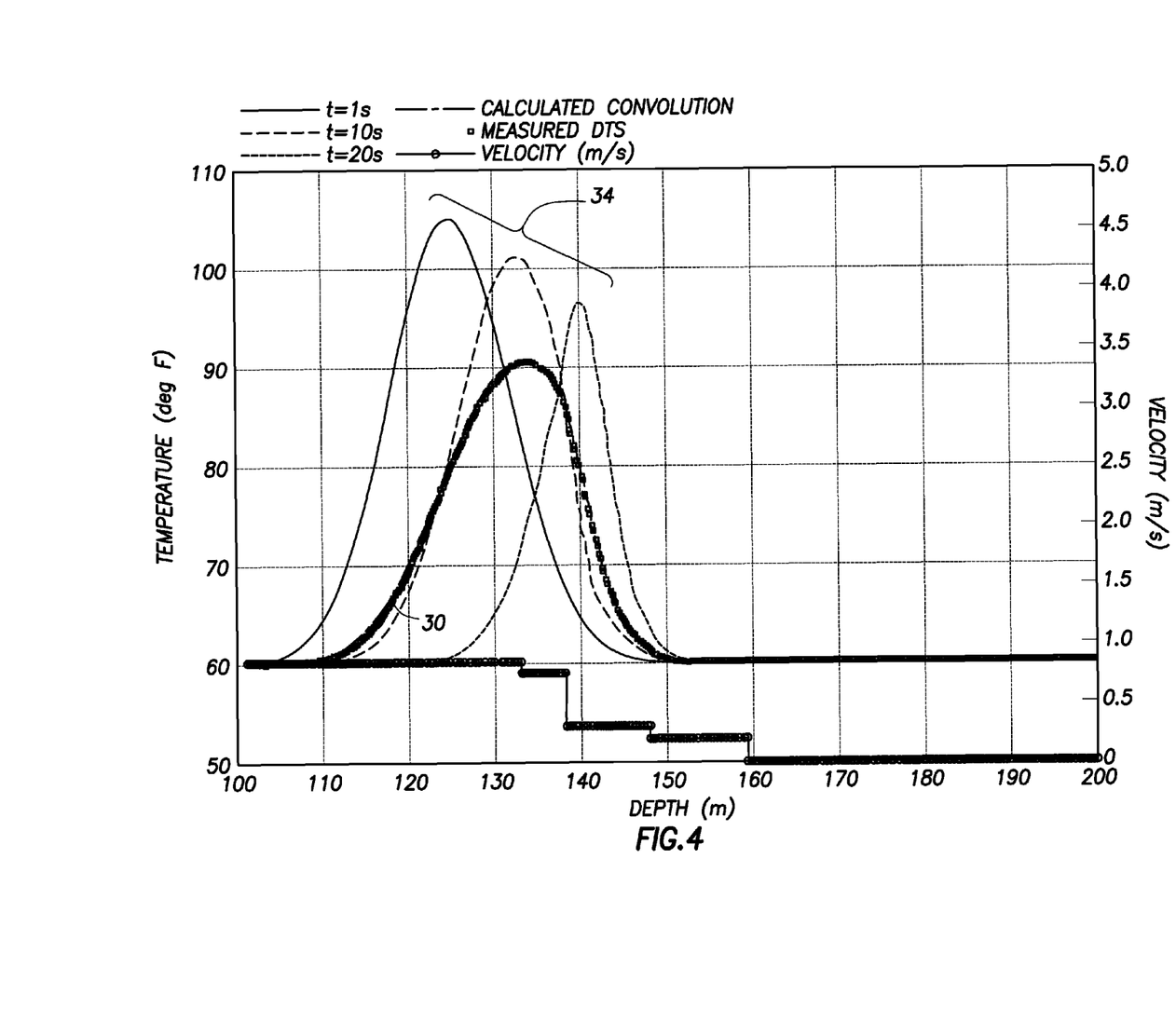
FIG. 4 is a graph of an example DTS temperature profile and fluid velocity distribution information resulting from deconvolving the DTS temperature profile.

Referring additionally now to FIG. 4, a measured DTS temperature profile 30 is deconvolved into individual temperature profiles 34, using previously determined shape information (from an acquisition time period in which a velocity of the fluid 12 is known). The deconvolution yields velocity information for the fluid 12 along the wellbore 16. This information shows how the velocity of the fluid 12 changes during the acquisition time period in which the DTS temperature profile 30 was acquired.

The resolution of the DTS temperature measurement is enhanced, in that velocity information is obtained for the acquisition time period in which a DTS temperature profile is acquired, rather than only from one acquisition time period to another. Stated differently, the fluid velocity can be known within a DTS temperature profile acquisition time period, instead of being calculated based on a thermal tracer's positions at respective different acquisition time periods.

Figure 5:
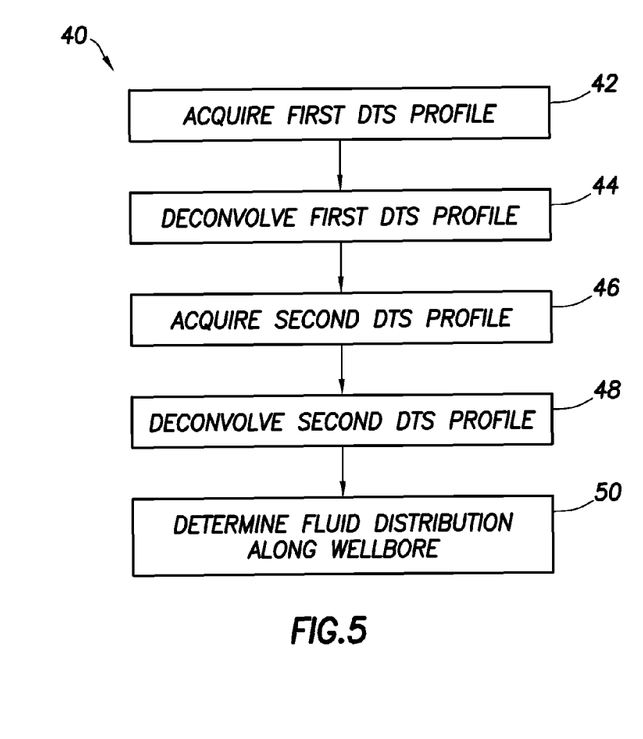
FIG. 5 is a flowchart for a method of enhancing resolution of DTS temperature profiles.

Referring additionally now to FIG. 5, the method 40 is schematically illustrated in flowchart form. The method 40 may be practiced with the well system 10, or with any other suitable well system.

In step 42, a first DTS temperature profile is acquired during a first acquisition time period. The designation "first" is used merely to distinguish this temperature profile from other temperature profiles, and does not indicate that the temperature profile is necessarily first in time. Preferably, the first temperature profile is acquired while a thermal tracer traverses a known wellbore geometry at a known velocity, and with no fluid exchange between the interior of the wellbore and the formation surrounding the wellbore.

In step 44, the first DTS temperature profile is deconvolved. The deconvolution of the first temperature profile yields the shape of the individual temperature profiles which were convolved to produce the first temperature profile.

Of course, it is not necessary for the first temperature profile to be acquired while a thermal tracer displaces at a known velocity. Instead, if the shape of the individual temperature profiles which were convolved to produce the first temperature profile is known, or can be deduced from the shape of the first temperature profile, then in step 44 the deconvolution of the first temperature profile can yield the velocity of the fluid.

In step 46, a second DTS temperature profile may be acquired during a second acquisition time period. The second temperature profile may be acquired while the thermal tracer traverses at least one wellbore section having fluid exchange with the surrounding formation.

In step 48, the second DTS temperature profile is deconvolved using the shape information derived from the deconvolution of the first temperature profile. The deconvolution of the second temperature profile yields the velocity information for the second acquisition time period.

Of course, if the shape information for the first temperature profile was not used to deconvolve the first temperature profile, but was instead known or deduced from the shape of the first temperature profile, as discussed above in relation to step 44, then this same shape information may be used in the deconvolution of the second temperature profile.

In step 50, fluid distribution along the wellbore is determined using the velocity information derived in steps 44 and/or 48, the known wellbore geometry (including locations and characteristics of the perforations, etc.), and any other relevant factors. In injection operations, a decrease in velocity of the fluid 12 as it traverses a set of perforations indicates the flow rate of the fluid into the formation surrounding the wellbore at those perforations. In production operations, an increase in velocity of the fluid 12 as it traverses a set of perforations indicates the flow rate of fluid received into the wellbore from the formation at those perforations.

As discussed above, the principles of this disclosure are applicable to a variety of distributed optical measurement techniques. For example, DAS and DVS measurements can be more accurately interpreted using the principles described herein.

Figure 6:
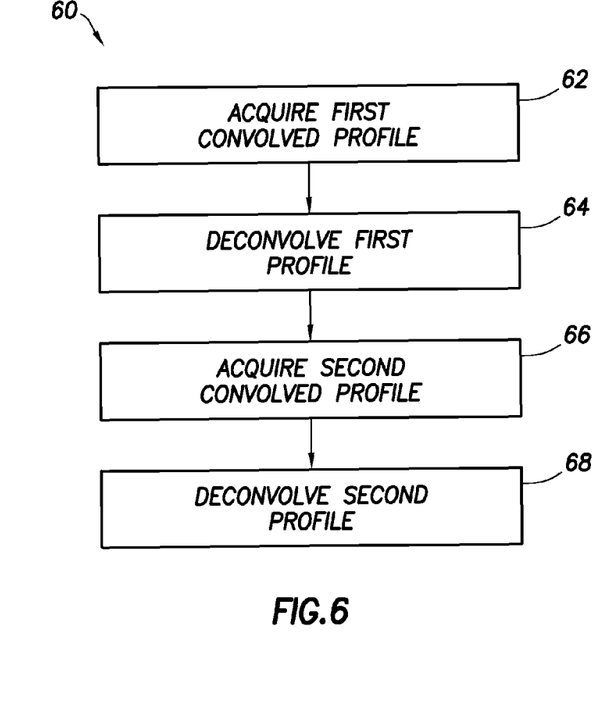
FIG. 6 is a flowchart for a method of enhancing resolution of distributed optical measurements along a wellbore.

Referring additionally now to FIG. 6, a more generalized method 60 is schematically illustrated in flowchart form. The method 60 is applicable to various distributed optical measurement techniques.

In step 62, optical signals are acquired during a first acquisition time period, producing a first profile. The first profile is a convolution of first and second functions.

In step 64, the first profile is deconvolved using a first function, which first function is known during the first acquisition time period. The deconvolution of the first profile yields the second function.

In optional step 66, optical signals are acquired during a second acquisition time period, producing a second profile. The second profile is also a convolved profile.

In optional step 68, the second profile is deconvolved using the second function derived in step 64. This yields the first function for the second acquisition time period.

The method 60 may be used in conjunction with any distributed optical measurement techniques including, but not limited to, DTS, DAS and DVS. In DTS, convolved temperature profiles can be deconvolved. In DAS, convolved acoustic profiles can be deconvolved. In DVS, convolved vibration profiles can be deconvolved.

It may now be fully appreciated that the present disclosure provides significant advancements to the art of interpreting distributed optical sensing measurements. In the well system 10 described above, the operating envelope for flow profiling with thermal tracers can be widened, with thermal tracers being applied in even more challenging conditions of high flow rate wells, hydraulic fracturing, short completion intervals, etc., even if acquisition time periods cannot be shortened for increased resolution. Furthermore, a more accurate and more objective flow distribution determination can be obtained with limited expertise on the part of an operator.

Because the deconvolution process can be automated (using appropriate mathematics software techniques), accurate injection or production flow distribution can be obtained without requiring subjective analysis by an expert. In addition, the flow distribution can be rapidly determined, thereby providing for "on-the-fly" real-time modification of an operation if necessary, and providing for desirably quick delivery of information to a customer.

The above disclosure provides to the art a method 60 of enhancing resolution of distributed optical measurements along a wellbore 16. The method 60 can include acquiring optical signals during at least a first acquisition time period, thereby producing a first convolved profile along the wellbore 16, and deconvolving the first profile using a first function corresponding to the first acquisition time period, thereby determining a second function.

The first convolved profile may be a convolution of the first and second functions.

The first function corresponding to the first acquisition time period is preferably known in the step of deconvolving the first profile.

The first function corresponding to the first acquisition time period may describe a velocity of fluid 12 along a first section 16*e* of the wellbore 16.

The first function corresponding to the first acquisition time period may describe a temperature distribution shape along a first section 16*e* of the wellbore 16.

The second function may describe a temperature distribution shape along the wellbore 16.

The optical signals may comprise Raman, Brillouin and/or Rayleigh backscattering of light transmitted through an optical waveguide 22.

The method 60 may further include acquiring optical signals during a second acquisition time period, thereby producing a second convolved profile along the wellbore 16, and deconvolving the second profile using the second function, thereby determining the first function corresponding to the second acquisition time period.

The first function corresponding to the second acquisition time period may describe a velocity of the fluid 12 along a second section (such as any of sections 16*a-d*) of the wellbore 16.

The first and second convolved profiles are preferably convolutions of the first and second functions at the respective first and second acquisition time periods.

Also described by the above disclosure is a method 40 of enhancing resolution of distributed temperature measurements along a wellbore 16. The method 40 can include acquiring optical backscatter signals during at least first and second acquisition time periods, thereby producing respective first and second convolved temperature profiles along the wellbore 16; deconvolving the first temperature profile using a first function corresponding to the first acquisition time period, thereby determining a second function; and deconvolving the second temperature profile using the second function, thereby determining the first function corresponding to the second acquisition time period.

The method 40 can also include determining fluid distribution along the wellbore 16, using the first function corresponding to the second acquisition time period.

The step of acquiring optical backscatter signals may be performed in response to transmitting light through an optical waveguide 22 extending along first and second sections 16*e*, 16*a* of the wellbore 16, the first temperature profile corresponding to the first section 16*e*, and the second temperature profile corresponding to the second section 16*a*.

A thermal tracer may traverse the first section 16*e* during the first acquisition time period, and the thermal tracer may traverse the second section 16*a* during the second acquisition time period.

An interior 24 of the wellbore 16 is preferably isolated from a formation 14 surrounding the first section 16*e*, and the interior 24 of the wellbore 16 is preferably in fluid communication with the formation 14 surrounding the second section 16*a*.

It is to be understood that the embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of enhancing resolution of distributed temperature measurements along a wellbore in a subterranean well, the method comprising:
   acquiring optical signals during at least a first acquisition time period using an optical waveguide extending longitudinally through the wellbore, thereby producing a first distributed temperature measurement profile along a first longitudinal section of the wellbore, wherein the first distributed temperature measurement profile is a convolution of first and second functions; and
   deconvolving the first distributed temperature measurement profile using the first function, thereby determining the second function, wherein the first function describes a velocity of fluid along the first longitudinal section of the wellbore and the second function describes a temperature distribution shape along the first longitudinal section of the wellbore.

2. The method of claim 1, wherein the optical signals comprise Raman backscattering of light transmitted through the optical waveguide.

3. The method of claim 1, wherein the optical signals comprise Brillouin backscattering of light transmitted through the optical waveguide.

4. The method of claim 1, further comprising:
   acquiring optical signals during a second acquisition time period, thereby producing a second distributed temperature measurement profile along a second longitudinal section of the wellbore; and
   deconvolving the second distributed temperature measurement profile using the second function which is determined by the deconvolution of the first distributed temperature measurement profile, thereby determining a third function corresponding to the second acquisition time period.

5. The method of claim 4, wherein the third function describes a velocity of fluid along the second section of the wellbore.

6. The method of claim 4, wherein the first profile is a convolution of the first and second functions during the first acquisition time period, and the second profile is a convolution of the second and third functions during the second acquisition time period.

7. A method of enhancing resolution of distributed temperature measurements along a wellbore in a subterranean well, the method comprising:
   acquiring optical signals during at least first and second acquisition time periods using an optical waveguide extending longitudinally through the wellbore, thereby producing respective first and second distributed temperature measurement profiles along respective first and second longitudinal sections of the wellbore;
   deconvolving the first distributed temperature measurement profile using a first function corresponding to the first acquisition time period, thereby determining a second function corresponding to the first acquisition time period, wherein the first function is known in the deconvolving of the first distributed temperature measurement profile, and wherein the second function describes a temperature distribution shape along the first longitudinal section of the wellbore; and
   deconvolving the second distributed temperature measurement profile using the determined second function, thereby determining a third function which describes a velocity of fluid along the second longitudinal section of the wellbore during the second acquisition time period.

8. The method of claim 7, further comprising determining fluid distribution along the second longitudinal section of the wellbore, using the third function.

9. The method of claim 7, wherein the first distributed temperature measurement profile is a convolution of the first and second functions, and the second distributed temperature measurement profile is a convolution of the second and third functions.

10. The method of claim 7, wherein the first function corresponding to the first acquisition time period describes a velocity of fluid along the first longitudinal section of the wellbore.

11. The method of claim 7, wherein the first distributed temperature measurement profile is a convolution of the first and second functions during the first acquisition time period, and the second distributed temperature measurement profile is a convolution of the second and third functions during the second acquisition time period.

12. The method of claim 7, wherein the acquiring is performed in response to transmitting light through the optical waveguide, the first distributed temperature measurement profile corresponding to the first longitudinal section of the wellbore, and the second distributed temperature measurement profile corresponding to the second longitudinal section of the wellbore.

13. The method of claim 12, wherein a thermal tracer traverses the first longitudinal section during the first acquisition time period, and wherein the thermal tracer traverses the second longitudinal section during the second acquisition time period.

14. The method of claim 12, wherein an interior of the wellbore is in fluid communication with a formation surrounding the second longitudinal section.

15. The method of claim 7, wherein the optical signals comprise Raman backscattering of light transmitted through the optical waveguide.

16. The method of claim 7, wherein the optical signals comprise Brillouin backscattering of light transmitted through the optical waveguide.

* * * * *